United States Patent
Clarke et al.

(10) Patent No.: US 9,637,132 B2
(45) Date of Patent: *May 2, 2017

(54) VEHICLE UNDER-BODY MOUNTED SENSOR AND CONTROL SYSTEM

(75) Inventors: Nigel Clarke, Whitley (GB); Edward Hoare, Whitley (GB); Thuy-Yung Tran, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 608 days.

This patent is subject to a terminal disclaimer.

(21) Appl. No.: 14/004,936

(22) PCT Filed: Mar. 15, 2012

(86) PCT No.: PCT/EP2012/054602
§ 371 (c)(1),
(2), (4) Date: Nov. 2, 2013

(87) PCT Pub. No.: WO2012/123554
PCT Pub. Date: Sep. 20, 2012

(65) Prior Publication Data
US 2015/0046071 A1 Feb. 12, 2015

(30) Foreign Application Priority Data

Mar. 15, 2011 (GB) .................................. 1104367.6
Aug. 17, 2011 (GB) .................................. 1114124.9

(51) Int. Cl.
*B60W 40/06* (2012.01)
*B60W 30/18* (2012.01)
(Continued)

(52) U.S. Cl.
CPC ............ *B60W 40/06* (2013.01); *B60W 10/04* (2013.01); *B60W 30/18018* (2013.01);
(Continued)

(58) Field of Classification Search
CPC .. Y02T 10/48; F02N 11/0814; F02N 11/0818; F02N 11/0833; F02N 2200/124;
(Continued)

(56) References Cited

U.S. PATENT DOCUMENTS

| 7,100,558 | B2 | 9/2006 | Amanuma et al. |
| 2005/0045134 | A1* | 3/2005 | Amanuma ............... B60K 6/44 |
| | | | 123/179.4 |
| 2010/0112387 | A1 | 5/2010 | Nagasawa |
| 2010/0238292 | A1 | 9/2010 | Sato |
| 2011/0202265 | A1* | 8/2011 | Norden ................. F01N 11/002 |
| | | | 701/113 |
| 2015/0046032 | A1* | 2/2015 | Clarke ............... B60G 17/0195 |
| | | | 701/37 |

FOREIGN PATENT DOCUMENTS

| CN | 1590737 A | 3/2005 |
| CN | 101682057 A | 3/2010 |

(Continued)

OTHER PUBLICATIONS

International Search Report for PCT/EP2012/054602 dated Jun. 11, 2012, 5 pages.

(Continued)

*Primary Examiner* — Sizo Vilakazi
(74) *Attorney, Agent, or Firm* — Reising Ethington P.C.

(57) ABSTRACT

A vehicle having a system for determining that there is a possibility that the vehicle has entered or is about to enter water at a vehicle wading depth. The system comprising at least one under-body mounted sensor both configured to remotely and directly detect the presence of water substantially below and about the under-body mounted sensor. The under-body mounted sensor may be an ultrasound transducer sensor both configured to estimate a depth of water the surface of which is substantially below the sensor and to detect the presence of water when the sensor is in contact with water. In response to determining that there is a possibility that the vehicle has entered or is about to enter water at a vehicle wading depth, the system is configured to implement one or more vehicle control strategies.

20 Claims, 3 Drawing Sheets

(51) Int. Cl.
*F02N 11/08* (2006.01)
*G01F 23/00* (2006.01)
*G01F 23/296* (2006.01)
*B60W 10/04* (2006.01)
*B60W 30/14* (2006.01)

(52) U.S. Cl.
CPC ...... *F02N 11/0837* (2013.01); *G01F 23/0076* (2013.01); *G01F 23/2962* (2013.01); *G01F 23/2965* (2013.01); *B60W 30/146* (2013.01); *B60W 2550/12* (2013.01); *B60W 2550/14* (2013.01); *B60W 2710/0644* (2013.01); *F02N 2200/124* (2013.01); *Y02T 10/48* (2013.01)

(58) Field of Classification Search
CPC .......... B60W 40/06; B60W 30/18018; B60W 10/04; G01F 23/0076; G01F 23/2962; G01F 23/2965
See application file for complete search history.

(56) References Cited

FOREIGN PATENT DOCUMENTS

| | | | |
|---|---|---|---|
| DE | 102004028157 B3 | 1/2006 | |
| DE | 102008041105 A1 | 2/2010 | |
| GB | 2376929 A * | 12/2002 | ......... B60G 17/0165 |
| JP | 2005069136 A | 3/2005 | |
| JP | 2009032513 A | 2/2009 | |
| JP | 2010221732 A | 10/2010 | |
| JP | 2010221808 A | 10/2010 | |

OTHER PUBLICATIONS

Japanese Office Action corresponding to JP application No. 2013-558446, dated Sep. 15, 2015, 14 pages.
Japanese Office Action for JP application No. 2016-004745, dated Oct. 4, 2016, 6 pages.

* cited by examiner

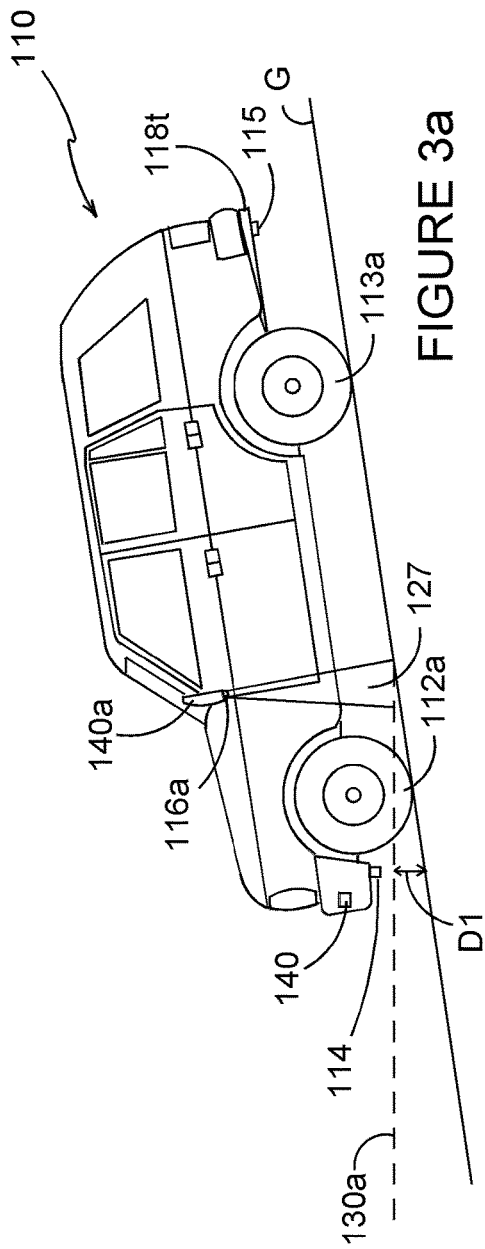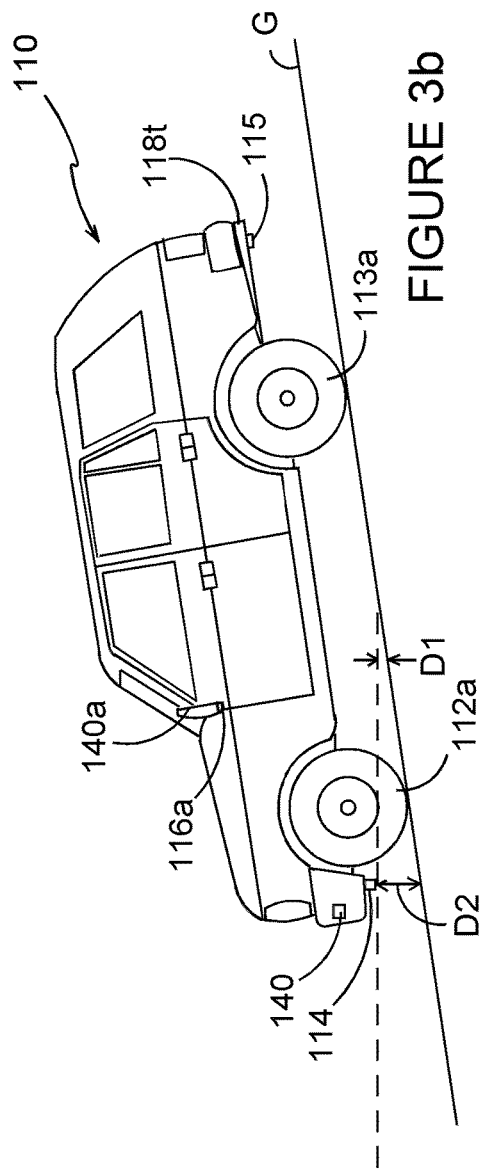

VEHICLE UNDER-BODY MOUNTED SENSOR AND CONTROL SYSTEM

CROSS-REFERENCE TO RELATED APPLICATIONS

This application claims priority from UK patent nos. GB1104367.6 filed Mar. 15, 2011 and GB1114124.9 filed Aug. 17, 2011, the entire contents of each of which are hereby incorporated by reference.

This invention relates to wading of wheeled vehicles and particularly, but not exclusively, to a sensor operative to detect the presence of water about the vehicle and to a system operative to take action, optionally preventative or pre-emptive action to protect and/or prepare a vehicle. Aspects of the invention relate to a sensor, to a vehicle to a system, to a program and to a method.

TECHNICAL FIELD

Road vehicles may be designed to travel through a body of water to a finite depth, which may be referred to as a maximum wading depth. Beyond this limit there is a risk that the vehicle engine and electronics may be damaged. Identifying that a vehicle has entered a wading situation is advantageous so that control systems of the vehicle can be deployed.

Driver judgement is required when entering water at wading depth and this may require a consideration of not only the vehicle ground clearance, but also factors such as the location of the engine air intake. A vehicle driver does not generally know the depth of water the vehicle is about to enter or the nature of the terrain below the water surface. This is particularly so in low visibility conditions (dirty water, low-light, heavy rain, fog). It is recommended that a survey of the terrain is taken by wading through water on foot, but factors such as, the variability of the terrain; low visibility conditions; inconvenience to the driver; and driver impatience may result in a driver attempting to traverse water without knowledge of the water depth and without taking appropriate precautions.

In WO/2012/080439 (PCT/EP2011/072998) (incorporated herein by reference) and WO/2012/080440 PCT/EP2011/072999) (incorporated herein by reference) to the present applicant, systems for detecting that a vehicle is wading are described. It is disclosed in WO '439 that two series of ultrasonic transducers may be disposed across front and rear bumpers of a vehicle respectively. Immersion of the ultrasonic transducers in water is used to confidently determine that the vehicle is immersed in water, at least up to the height of the sensors. The sensors being positioned on the bumper are disposed at a height suitable for indicating that the vehicle is in a wading situation. In WO '440 another system for detecting wading is disclosed, in which a change in the time of flight, wavelength or amplitude of an acoustic pulse emitted and received by sensors of the system is used to detect the presence of water about the sensors.

In WO/2012/080429 (PCT/EP2011/072986) (incorporated herein by reference), also to the present applicant, a control system for a wading vehicle is described, wherein a vehicle, having a wading sensor adapted to identify wading above a predetermined depth of water, comprises a control system adapted to implement one or more vehicle control strategies upon detection of wading by said sensor.

The present invention seeks to provide a further improvement for land-based vehicles that may travel through water, for example, at a wading depth by providing a system operative to take preventative or pre-emptive action to prepare and/or protect a vehicle that is possibly about to enter into water at wading depth. Advantageously, the systems and methods of the present invention seek to predict or detect that a vehicle may be about to enter into water at or above a threshold wading depth and prior to the vehicle being disposed in water of such a wading depth, prepares the vehicle for wading in advance of possible vehicle part-submersion in water at or above a threshold wading depth. Other aims and advantages of the invention will become apparent from the following description, claims and drawings.

In this specification, the term wading relates to travel of a land-based vehicle through water of a depth that is sufficient to require that the vehicle driver take appropriate precautions. To distinguish a wading event from a vehicle driving through a shallow puddle, in some situations wading depth may be defined as water of 200 mm or more in depth. In some situations water at a level of the front or rear wheel hubs may be indicative of a vehicle in water at wading depth. In some situations wading depth may be defined as the point at which a water contact sensor is immersed in water. However, the depth at which it is determined that a vehicle is wading (sometimes referred to as a threshold wading depth) may be determined by the vehicle design and it is therefore not possible to define a threshold wading depth that is appropriate for all vehicles. Similarly, the permissible maximum wading depth of a vehicle is determined by the vehicle design.

In this specification the term control threshold depth is used to define a depth of water, optionally relative to a vehicle in normal ride height that is optionally below or close to the threshold wading depth for a vehicle. In some situations control threshold depth may be defined as water of about 100 mm to about 200 mm or more in depth. In some situations, control threshold depth may be defined relative to the height of a vehicle tail pipe outlet or other vehicle component and control threshold depth may be defined as at least 20 mm below the opening of a vehicle exhaust tailpipe outlet.

Throughout the specification reference is made to the term water. It will be understood that in the context of a land-based vehicle driving through water, the term "water" is intended to encompass all liquid media that a land-based vehicle may drive through and is not limited in its interpretation to pure $H_2O$. For example, as used herein water may mean, but not limited to: a muddy river bed; sea-water; a ford; and dirty water in off-road terrain.

SUMMARY

Aspects of the invention provide a sensor, a vehicle, a system, a program and a method.

According to one aspect of the invention, for which protection is sought, there is provided a vehicle comprising at least one under-body mounted sensor both configured to remotely and directly detect the presence of water substantially below and about the under-body mounted sensor.

Optionally, the vehicle comprises a system for determining that there is a possibility that the vehicle has entered or is about to enter water at a vehicle wading depth, the system comprises said at least one under-body mounted sensor and where, in response to determining that there is a possibility that the vehicle has entered or is about to enter water at a vehicle wading depth, the system is configured to implement one or more vehicle control strategies.

Optionally, there may comprise more than one under-body mounted sensor; one or more of the under-body mounted sensors may be an ultrasound transducer sensor and the or each ultrasound transducer sensor may be both configured to determine a depth of water the surface of which is substantially below the sensor and to detect the presence of water when the sensor is in contact with water.

Additionally, or alternatively, the or each ultrasound transducer sensor may be configured to emit a pulsed ultrasound signal and may be configured to receive a reflection of that pulsed ultrasound signal for determining a distance to a surface substantially below the sensor and wherein the ultrasound transducer sensor is configured to issue a signal to a control unit of the system indicative of a settling time of a diaphragm of the ultrasound transducer sensor for detecting the presence of water about the ultrasound transducer sensor.

Optionally, the system may comprise more than one under-body mounted ultrasound transducer sensor and at least one sensor may be disposed proximate the front of the vehicle and at least one other sensor may be disposed proximate the rear of the vehicle.

Optionally, at least one sensor may be located on a vehicle, proximate or adjacent to: an exhaust tailpipe; a vehicle exhaust particle filter; and/or an under-body battery pack.

Additionally or alternatively, in determining that there is a possibility that the vehicle is about to enter water at a wading depth, the system may be configured to consider any one or a combination of: the mounting height of the under-body mounted ultrasonic sensor; the instant ride height of the vehicle; the vehicle drive speed; the height of the tailpipe; the depth of water, the surface of which is substantially below the sensor; the vehicle attitude; and the wading depth of the vehicle.

In certain embodiments, the vehicle comprises a powertrain and a powertrain controller arranged to control said powertrain and wherein said one or more vehicle control strategies may comprise controlling the powertrain in dependence on detection of water by said sensor. Further optionally, the powertrain controller may be arranged to suspend a stop/start function of the powertrain so as to prevent automatic shut down of the powertrain in response to the detection of water in contact with said sensor or in response to detection of water at a control threshold depth.

Optionally, the control threshold depth may be a water depth between ground level and the position of the sensor and/or may be a water depth of about 100 mm to about 200 mm.

According to a further aspect of the invention, for which protection is sought, there is provided a method of controlling a vehicle having an engine comprising:
(i) detecting that the vehicle is wading or that there is a possibility of the vehicle wading;
(ii) suspending a stop/start function of the vehicle so as to prevent automatic shut down of the engine; and/or
(iii) activating a stopped internal combustion engine.

It will be recognised that it may only be possible to re-start a stopped combustion engine in a timely manner if a remote ranging sensor is used to detect a water level as it approaches the vehicle.

According to yet a further aspect of the invention, for which protection is sought, there is provided a method of controlling a vehicle, the method comprising:

(i) using at least one under-body mounted sensor both configured to remotely and directly detect the presence of water substantially below and about the under-body mounted sensor; and
(ii) determining that there is a possibility that the vehicle has entered or is about to enter water at a vehicle wading depth in dependence upon the at least one under-body mounted sensor.

Optionally, in response to determining that there is a possibility that the vehicle has entered or is about to enter water at a vehicle wading depth, the method may further comprise:
(iii) implementing one or more vehicle control strategies.

Further optionally said one or more vehicle control strategies may comprise suspending a stop/start function of the vehicle so as to prevent automatic shut down of the combustion engine.

According to yet another aspect for which protection is sought, there is provided a program for implementing the method of the relevant preceding paragraphs.

According to yet a further aspect of the invention for which protection is sought, there is provided a kit of parts for installation and assembly to a vehicle, the assembly comprising: at least one remote and contact sensor for mounting on an under-body of a vehicle and a program according to the preceding paragraph and whereupon installation of the kit of parts in a vehicle, a vehicle according to any of the relevant preceding paragraphs is formed.

Within the scope of this application it is envisaged that the various aspects, embodiments, features, examples and alternatives, and in particular the features thereof, set out in the preceding paragraphs, in the claims and/or in the following description and drawings may be taken independently or in any combination thereof. For example features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings in which:—

in FIG. 2 a series of water levels relative to the vehicle are depicted in dashed lines;

FIG. 3a is a schematic side view of the vehicle of FIG. 2 positioned on an inclined surface travelling toward and entering water of unknown and variable depth; wherein a vehicle control system is configured to detect the early presence of water at a depth $D_1$ that is below a threshold wading depth for the vehicle and which is below an optional control threshold depth of the system; and FIG. 3b is a schematic side view of the vehicle of FIG. 2 positioned on an inclined surface travelling toward water and partially disposed in water, wherein a remote sensor of the vehicle control system is configured to detect the presence of water at depth $D_2$.

DETAILED DESCRIPTION OF EMBODIMENTS

Figure 1:
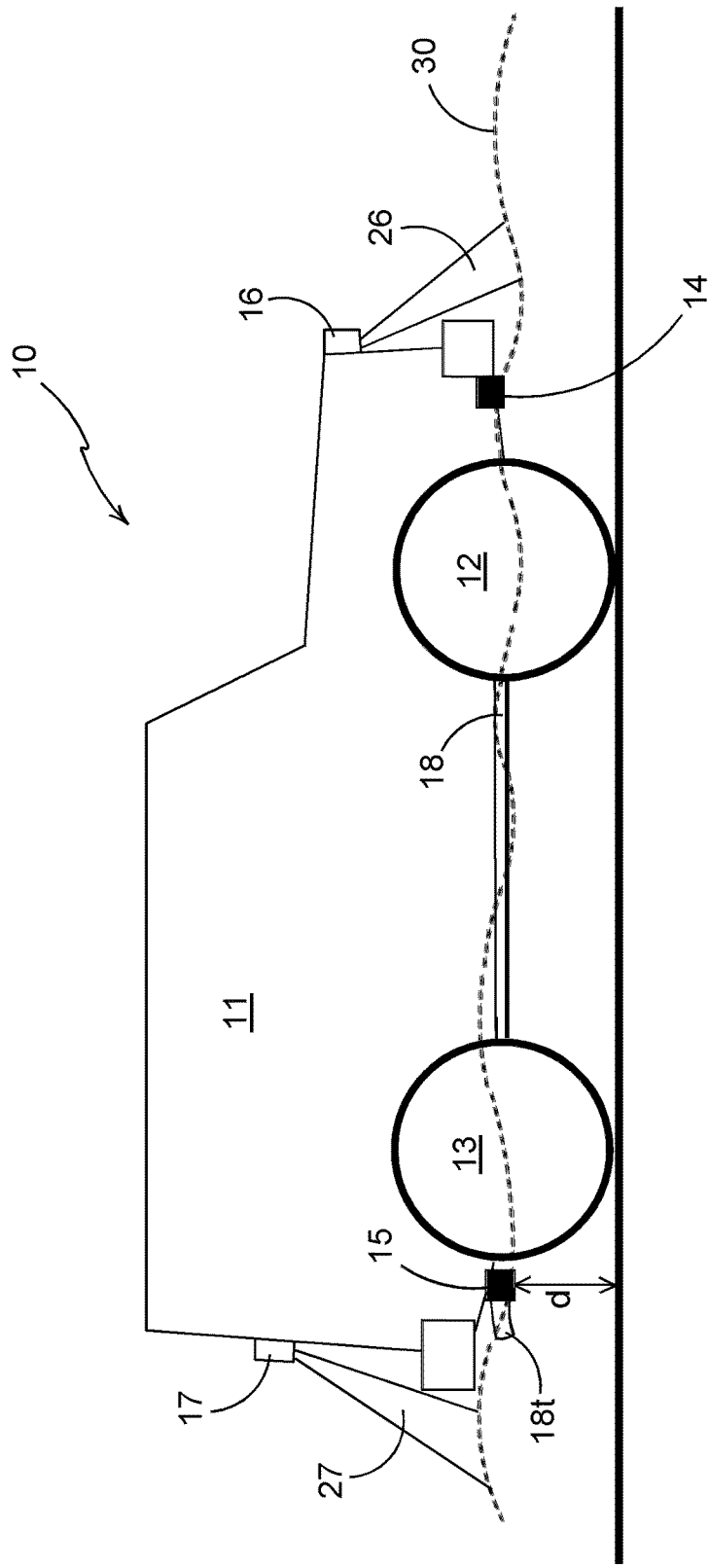
FIG. 1 is a schematic drawing of a wading vehicle having an under-body mounted sensor.

Detailed descriptions of specific embodiments of the vehicle, system, method and sensors of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the vehicle, system, method and sensors described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Generally, aspects of the present invention relate to a system for a vehicle configured to monitor the environment in which the vehicle is being driven, specifically to determine whether there is a possibility that the vehicle may be about to enter into a wading situation. In response to making a determination that a vehicle may be about to enter into a wading situation, the system is configured to initiate one or more pre-emptive actions to prepare the vehicle for wading. Preferably, the system utilises a contact water detection sensor located on an underside of a vehicle body to confidently detect the presence of water at a level relative to the vehicle and/or a remote-water detection sensor located on an underside of the vehicle body to predict the presence of water and/or detect the approach of the surface of a body of water as the vehicle drives through a body of water. The system is configured to monitor the data obtained by the under-body sensor over time and based on an analysis of the received data predict that water may be about to come into contact with the vehicle body. Optionally, before water of sufficient depth to at least partially immerse the vehicle body comes into contact with the vehicle, one or more preventative control actions are taken by the system.

As such, aspects of the present invention relate to a system for a vehicle that uses an under-body mounted remote water ranging and water contact detection sensor to track the rise (and/or optionally fall) of a water surface level as a vehicle approaches, enters and progresses through the water.

Additional data optionally obtained from other systems of the vehicle for example, but not limited to: the selected terrain mode (OFF-ROAD, ON-ROAD); the transmission mode (2WD, 4WD); the vehicle driving speed; the vehicle driving direction (forwards, reverse); rain sensor data; external camera imagery; GPS and other satellite or other navigation system data; the attitude of the vehicle (roll, yaw and pitch); and ride-height, may be used by the system of the present invention. Information from the vehicle may be transmitted directly to the system of the present invention from the vehicle control system having that data (for example, the suspensions system) or may be transmitted via an associated controller via a vehicle CAN-bus or similar vehicle-based data network.

In this way, embodiments of the present invention provide a system that receives timely information to enable measures to be taken to assist and manage the vehicle as it enters and passes through water. For example, the data provided to and analysed by a system, is used to determine whether there is a possibility that a vehicle has or may be about to enter into a wading situation. This may be referred to as a "positive determination". In response to making a positive determination, the system may cause, for example, any one or more of the automatic (or driver instructed):

activation of an internal combustion engine of a hybrid vehicle that was operating in electric only drive mode; and/or suspension of a start-stop fuel saving mode of a vehicle.

Turning now to a specific illustrated embodiment of an exemplary embodiment of the invention, reference is made to FIG. 1. FIG. 1 illustrates a two-axle vehicle 10 in schematic form comprising a body 11 and wheels 12, 13. The vehicle 10 comprises a system (not numbered) for determining whether there is a possibility that the vehicle 10 may be about to enter into a wading situation. The system comprises a control unit (not illustrated) coupled to one or more water detection sensors 14, 15 (also referred to simply as sensors 14, 15). A first of the water detection sensors 15 is mounted to the vehicle 10 underside, optionally adjacent to or located on an exhaust system 18 component. A second water detection sensor 14 is provided, optionally also located on the underside of the vehicle body 11. Preferably, though nevertheless optionally, the two water detection sensors 14, 15 are located adjacent the front and rear lower edges of the vehicle 10 respectively. As is shown in FIG. 1, the rearmost water-detection sensor 15 is mounted adjacent to a tailpipe 18t of the exhaust system 18 of the vehicle 10.

The sensors 14, 15 are configured and arranged optionally to detect a change in the medium with which the sensors 14, 15 are in contact and/or to measure or estimate a distance to a surface 30 disposed substantially beneath the sensors 14, 15, intermediate the sensors 14, 15 and the ground.

It may be seen from FIG. 1 that the sensors 14, 15 are mounted at or below the level of at least part of a vehicle exhaust system 18. This arrangement is configured to be in contact with, or otherwise detect, the presence of water as soon as the water reaches a height 'd' where the water may affect the performance of the vehicle 10 exhaust system 18. It will be appreciated by one skilled in the art that significant ingestion of water into the exhaust system is highly undesirable. The risk of water ingestion is increased for a hybrid vehicle being driven either in electric only mode (where no exhaust gas is emitted from the exhaust system) or for a vehicle employing start-stop fuel saving technology, where the internal combustion engine may be temporarily suspended thus suspending the emission of exhaust gas which may otherwise resist ingress of water.

The sensors 14, 15 illustrated in FIG. 1 optionally are ultrasound emitters/receivers (transducers). Such sensors 14, 15 may include a diaphragm which is energized momentarily to transmit an ultrasound pulse. Such a diaphragm has a substantially different settling time in water, as compared with the settling time in air, and can thus be adapted to give the required output signal upon contact with water. For contact-sensing of the presence of water, the settling time of a diaphragm of the ultrasound transducer may be monitored by the control unit to determine the presence of water about the sensor 14, 15 WO/2012/080439 (PCT/EP2011/072998) (as in described in and WO/2012/080440 (PCT/EP2011/072998)

Additionally, in another embodiment of the invention, the sensors 14, 15 are remote ranging sensors. Optionally the sensors 14, 15 are arranged to face substantially downwardly or at a declined angle as desired in order to measure the distance to a surface 30 beneath the sensor 14, 15. In the presently illustrated exemplary embodiment, each sensor 14, 15 is an ultrasound transducer 14, 15 and is capable of emitting an ultrasound pulse and receiving a reflection of that pulse. The time of flight (TOF) of an ultrasound pulse in air is known; the mounting height of the ultrasound transducer 14, 15 is also known (giving due regard to vehicle ride height and attitude). Therefore the distance from the sensor 14, 15 to an object or surface level below the sensor can be determined. In normal ride height and dry conditions the detected distance will be 'd', the distance between the sensor 14, 15 and the ground level. However, if a water surface 30 is present between the sensor 14, 15 and the ground level, then the reflected ultrasound pulse will arrive back at the sensor 14, 15 in a shorter time (having travelled a shorter distance). From the measured TOF data signal, the distance $d_{30}$ to the water level surface 30 can be determined and as such an estimation of the water depth $D_{water}$ can also be made: $D_{water} = d - d_{30}$. (Again due regard to and compensation for the vehicle 10 ride height and vehicle 10 attitude is preferable in order to estimate the depth of the water accurately)

It will be appreciated that in other envisaged embodiments, only one sensor 14, 15 may be provided on the vehicle 10. In other envisaged embodiments a single sensor 15 may be disposed at, adjacent or close to an exhaust tailpipe 18*t* of the vehicle 10. Alternatively, more than one sensor 14, 15 may be provided on the vehicle 10. The sensors 14, 15 may be variously positioned and arranged. The greater the number of sensors used, the greater amount of data regarding the vehicle environment is provided to the system and the more accurate may be the system's determination of a possibility of the vehicle 10 entering water of a sufficient depth that taking pre-emptive control operations is justified.

Additionally or alternatively, remote sensors 16, 17 are optionally provided. The remote sensors 16, 17 may be acoustic transducers and may for example transmit a pulsed ultrasound beam 26, 27 which is detected upon reflection. The signal transmission time (TOF) is, as described above, used by the system to determine the relative position of water surface 30 level with respect to the mounting position of the sensors 16, 17 on the vehicle 10. From this information, an estimation of the depth of the water within the range of the sensor's beam 26, 27 can be calculated.

It will be appreciated by one skilled in the art that where the remote sensors 16, 17 are fitted to a vehicle 10 with adjustable ride height, the calculation or estimation of water depth based on the fixed-position of the sensors 16, 17 will require compensation to take into account the current ride height and/or attitude of the vehicle 10. Information indicative of the ride height and attitude of the vehicle 10 may be transmitted by the vehicle suspension or an associated controller via a vehicle CAN-bus or similar vehicle-based data network.

The remote sensors 16, 17 are used in the system of the presently described embodiment to detect the surface 30 of water disposed about the vehicle 10. At the time illustrated in FIG. 1, the vehicle 10 is disposed in a depth 'd' of water that may be considered as equal to or greater than a wading depth (giving consideration to the partial submersion of the tailpipe 18*t*). However, during a time period prior to the vehicle 10 entering into water of that depth 'd', the remote sensors 16, 17 and/or remote and contact sensors 14, 15 will have issued data to the control unit of the system. Analysis of the data by the system will have enabled the system to gradually detect an increase in the relative position of the water surface level 30 over time (indicating a rise in water level, where the surface 30 gradually approaches the vehicle under-body). From this and optionally by using a control threshold depth, the system would have made a determination that there was a possibility that the vehicle 10 was about to enter into water of a significant depth, prior to the vehicle 10 being at least partially immersed in water of depth 'd'. Optionally, the control threshold depth may be between about 100 mm and about 200 mm.

In this embodiment, the vehicle 10 is a hybrid vehicle 10 having both an internal combustion engine (not shown) and an electric motor (not shown). As such the vehicle 10 has a powertrain comprising two means of propulsion: an internal combustion engine and an electric motor. The system for detecting a possibility that the vehicle 10 may be about to enter into sufficiently deep water is optionally configured to issue a command signal to a powertrain controller. The powertrain controller (not illustrated) is arranged to control the powertrain to provide the vehicle 10 with a stop/start mode for improving fuel consumption and/or emissions when the vehicle 10 is stationary. In other envisaged embodiments, the vehicle 10 is not a hybrid vehicle, but may nevertheless have a powertrain controller (not illustrated) arranged to control the powertrain to provide the vehicle 10 with a stop/start mode for improving fuel consumption and/or emissions when the vehicle 10 is stationary.

Specifically, as is known, the powertrain controller may be arranged to switch off the engine automatically when the vehicle 10 comes to a standstill and the brake pedal is depressed or the parking brake is actuated. When the brake pedal is released and/or the throttle pedal depressed, the powertrain controller is arranged to start the engine automatically so that the vehicle 10 can move off.

In embodiments of the invention, however, the powertrain controller, in dependence on the system for determining the possibility that the vehicle 10 may be about to enter a wading event or that part of the vehicle body 11 may be or may become partially submerged, is commanded or instructed or otherwise arranged to temporarily suspend activation of the stop/start mode in order to reduce the risk of water ingress into an exhaust system 18 or other vehicle 10 component whilst wading is in progress. That is, the powertrain controller is prevented from stopping the engine during wading, even if the vehicle 10 becomes stationary with the brake pedal depressed and/or the parking brake activated.

The system of the presently described embodiment is also configured such that if the hybrid vehicle 10 was operating in electric only drive mode, at an appropriate time at or shortly after determining that there is a possibility that the vehicle 10 will enter into a body of water optionally at wading depth, the system will communicate with the powertrain controller to activate the internal combustion engine. This may optionally be of benefit to enable a positive pressure to be generated in the exhaust system 18 to reduce the possibility of or the effects of water ingress into the exhaust and exhaust gas after-treatment system components, prior to or well before a water level reaches the level of the exhaust tail pipe 18*t*. As such, the one or more pre-emptive action(s) taken by the system may be a protective or preventative measure to ensure that the exhaust system 18 is protected against water ingress well before the exhaust tailpipe 18*t* is submerged in water at or above vehicle wading depth 'd'.

Additionally, when information about the depth 'd' of the water is available to the system, the system may cause (either directly or via the ECU) the exhaust gas pressure to be appropriately controlled, optionally by regulating the idle speed of the engine by modifying the engine speed control system (throttle, fuel injection for example, as appropriate). When it has been determined by water depth measurement (from sensors 14, 15, 16, and/or 17) that the exhaust tail pipe outlet 18*t* is or is possibly about to be submerged the engine speed may be also raised, or controlled, further, if necessary, to increase the positive pressure in the exhaust system. This equally is applicable to vehicles 10 travelling forwards or backwards (for example, boat launch/recovery). Optionally, in other embodiments, the system may be configured to have a lower control threshold depth in certain situations, for example, in the situation where the vehicle 10 is being driven in reverse gear; and/or in a "nose-up" attitude. This is because the exhaust tail pipe outlet 18*t* will reach water at its level more quickly compared to the vehicle 10 moving forwards, where the tail pipe 18*t* is at the trailing end of the vehicle 10 rather than at the leading end.

Figure 2:
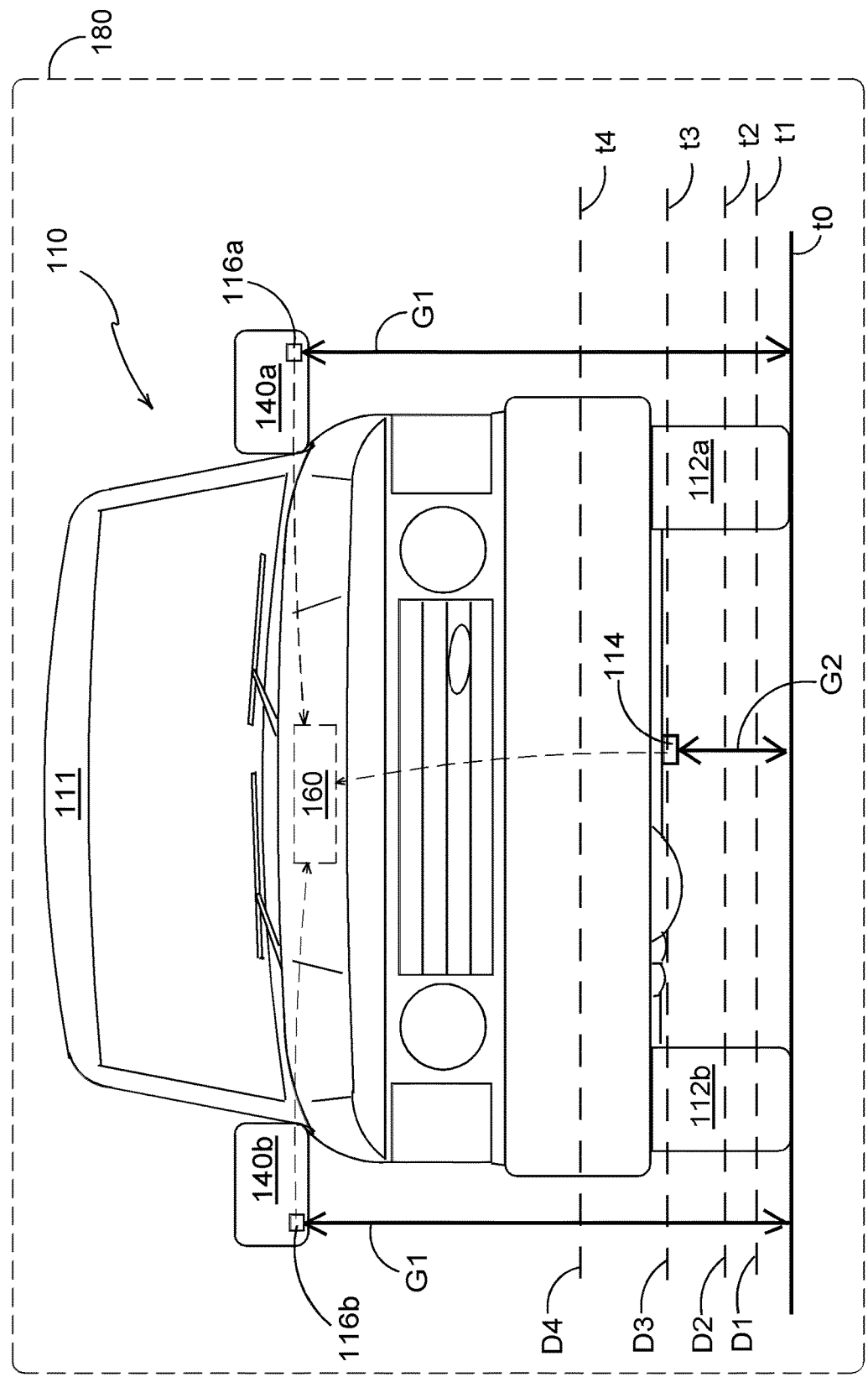
FIG. 2 is a schematic front view of a vehicle having a system for pre-emptively controlling vehicle operations or functions in response to the detection of water about the vehicle before the vehicle enters water at wading depth and/or before the vehicle body is partly immersed in water.

In a further embodiment of the invention, illustrated in FIGS. 2 to 3*b* there is provided a vehicle 110 having a system 180 comprising one or more or a combination of sensors 116*a*, 116*b*, 114, 115, 140 for remotely detecting the presence of water. The one or more sensors 116*a*, 116*b*, 114, 115, 140 are coupled to a control unit 160 and are configured to issue data to the control unit 160 of the system 180. Remote sensors 116*a*, 116*b* may be mounted to each of the wing mirrors 140*a*, 140*b*. In another embodiment of the invention the system does not comprises any remote sensors 116*a*, 116*b*. Optionally, the vehicle 110 may also comprise one or more contact sensors 140 disposed along the front and/or rear bumper of the vehicle 110 for further confirming a minimum water depth in which the vehicle 110 is disposed. Preferably, but nevertheless optionally, an under-body mounted sensor 114, 115 may be located on or proximate to the exhaust system of the vehicle 110. In the presently illustrated embodiment, each sensor 116*a*, 116*b*, 114, 115, is a substantially downwardly facing ultrasonic transducer capable of emitting and receiving an ultrasound pulse as described above. In the illustrated example, the vehicle 110 is travelling at normal ride height and on an inclined pitch. Data from each sensor 116*a*, 116*b*, 114, 115, 140 is made available to the control unit 160 of the system 180, as mentioned above, information indicative of the ride height and attitude of the vehicle 110 as well as other information (for example journey route information from a navigation system which may provide relevant data regarding the terrain ahead of the vehicle 110, such as the presence of a ford) may be transmitted by the vehicle 110 suspension or an associated controller via a vehicle 110 CAN-bus or similar vehicle-based data network to the control unit 160 of the system 180.

With reference to FIG. 2, a vehicle 110 is shown in which a progressively increasing water level is depicted (by a series of dashed lines, $D_1$, $D_2$, $D_3$, $D_4$) relative to a vehicle 110 disposed on a flat surface. In the depicted situation, the water level has steadily risen from:
  ground level G at $t_0$; to
  a shallow non-wading depth D1 at time $t_1$; to
  a shallow, non-wading first control threshold depth of the vehicle D2 at time $t_2$; to
  a wading depth of the vehicle D3 at time $t_3$; and
  to a deeper, but non-maximum wading depth D4 at time $t_4$.

The control unit 160 is configured to conduct an assessment of the environment the vehicle 110 is in by analysing the data issued to it by the one or more sensors 116*a*, 116*b*, 114, 115, 140 over time.

In some embodiments the system 180 is provided only with information from the under-body mounted sensors 114, 115 and vehicle ride height and vehicle attitude data. Thereby, with reference to the situations illustrated in FIG. 2, the system of such an embodiment is provided with the following data over time:

At time period $t_0$, the system 180 is provided with the following data:
  sensor 114: distance G2 to detected surface level matches distance to ground G and no indication of water in contact with sensor 114; and
  sensor 115: distance G2 to detected surface level matches distance to ground G and no indication of water in contact with sensor 115.

At time period $t_0$, the system 180 is configured to determine that neither the front or the rear of the vehicle 110 is disposed in any water and monitoring of the data received by the control unit 160 of the system 180 is continued.

At time period $t_1$, the system 180 is provided with the following data:
  sensor 114: distance G2 to detected surface is less than the distance to ground level G and is at a depth D1 above the ground level G and no indication of water in contact with sensor 114; and
  sensor 115: distance G2 to detected surface is less than the distance to ground level G, at depth D1 above ground level G and no indication of water in contact with sensor 115.

At time period $t_1$, the system 180 is configured to determine that at least a portion of the vehicle 110 is likely to be disposed in shallow water of depth $D_1$. At this time only the wheels of the vehicle 112*a*, 113*a* and not the vehicle body are likely to be disposed in water. This is because the under-body remote sensors 114, 115 have each detected a water level between its position and the ground surface. The system 180 may also be configured to determine that because the depth D1 is greater than the ground level (the last measurement) that the vehicle 110 is moving into water that is increasing in depth. Monitoring of the data received by the control unit 160 of the system 180 is continued but the system 180 at this stage takes no other action. At a depth $D_1$, the water level alone may not be taken as a positive determination that the vehicle 110 may be about to enter water of a sufficient depth to require precautions to be taken. Indeed the shallow depth water $D_1$ may merely be a puddle. As such the system is configured in this embodiment to gather further data.

At time period $t_2$, the system 180 is provided with the following data:
  sensor 114: distance G2 to detected surface is less than distance to ground level G, at depth D2 above ground level G and no indication of water in contact with sensor 114; and
  sensor 115: distance G2 to detected surface is less than the distance to ground level G, at depth D2 above ground level G no indication of water in contact with sensor 115.

At time period $t_2$, the system 180 is configured to determine that the vehicle 110 is disposed in shallow water (for the same reason as above—remote sensors 114, 115 detect intervening surface at depth $D_2$). Because the water depth is measured to be at the control threshold depth and/or because the water level has risen from D1 to D2 indicating that the vehicle 110 is still moving into still deeper water, the system 180 determines that there is a possibility that the vehicle 110 will enter into deeper water. The system 180 is configured to take at least one appropriate pre-emptive action upon or shortly after making this positive determination in order to protect the vehicle 110 and/or to prepare the vehicle 110 for wading (for example: suspend start-stop mode; or activate internal combustion engine if off; and/or increase vehicle ride-height).

By making a determination that the vehicle 110 is likely to be entering deeper water the system 180 is configured to take at least one pre-emptive action either automatically or by alerting the driver and making recommendations to the driver for the driver to take at least one pre-emptive action. The at least one pre-emptive action in the presently described embodiment is to de-activate (or at least temporarily suspend) the "start-stop" mode of a hybrid vehicle. (The "start-stop" mode may also be referred to as the Engine Fuel Saving Mode.)

At time period $t_3$, the system 180 is provided with the following data:
  sensor 114: water detected in contact with sensor 114 at depth D3 above ground level G which is, in this situation equivalent to the wading depth threshold for the vehicle 110;
  sensor 115: water detected in contact with sensor 115 at depth D3 above ground level G which is, in this situation equivalent to the wading depth threshold for the vehicle 110.

At time period $t_3$, the system 180 is configured to determine that the vehicle 110 is disposed in water at depth D3 at threshold wading depth. This determination is a confident determination because water is in contact with the contact-sensors 114, 115 at the vehicle 110 wading depth height. Because the water level has risen from D2 to D3 the system 180 is configured to determine that the vehicle 110 is still moving into deeper water and that there is a possibility that the vehicle 110 will enter into even deeper water (this determination may also based upon the vehicle attitude and direction of travel). At least one action may optionally be taken at or shortly after this determination to protect the vehicle and further prepare the vehicle and driver for wading (optionally as described in WO/2012/080429 (PCT/EP2011/072986).

At time period $t_4$, the system 180 is provided with the following data:
  sensor 114: water detected in contact with sensor 114; and sensor 115: water detected in contact with sensor 115.

At time period $t_4$, the system 180 is configured to determine that the vehicle 110 is disposed in water of a depth greater than wading depth threshold but less than maximum wading depth. All pre-emptive actions have already been taken. Further control strategies may be initiated optionally as described in PCT/EP2011/072986.

In the presently described and illustrated embodiment, the system 180 is further configured to exit the vehicle 110 from the "prepared for possibility of wading mode". This is so that the system 180 or an additional system, can appropriately override the pre-emptive control strategies that were taken when a positive determination regarding the possibility of the vehicle 110 entering into water at wading depth were implemented. Additionally or alternatively, the exit strategy implemented by the system 180 may initiate other alternative vehicle operations or may only selectively undo or override the pre-emptive control strategies that were carried out. The system 180 presently described is configured to determine that a suspended start-stop mode can be reactivated, for example:
  manually by the driver at any time; or
  automatically or manually by the driver when vehicle drive speed exceeds a non-wading threshold drive speed (optionally the non-wading threshold drive speed may be between about 8 kph and about 15 kph); or
  automatically if the water level detected by all sensors of the system is below either the control threshold depth or below an exit threshold depth and optionally has been for more than a pre-determined time limit (optionally for example 1 minute).

Wherein the control threshold depth is optionally defined as greater than a shallow depth $D_1$ and less than a wading depth and wherein the exit threshold depth is optionally defined as equal to or less than a shallow depth $D_1$ or alternatively a zero depth.

Typically in an off-road driving situation, a vehicle 110 will not be travelling on a perfectly level surface. In FIGS. 3a and 3b another situation is depicted. The vehicle 110 with system 180 of the presently described embodiment (optionally having only the data provided by the under-body sensors 114, 115) is depicted travelling down an inclined surface G toward some standing water. Due to the inclined nature of the terrain G upon which the water is standing, the depth of the water increases down the slope, however the surface of the water 130a remains approximately level. With reference to the situation illustrated in FIGS. 3a and 3b optional additional operation of the system 180 of the present embodiment is described over time:

In FIG. 3a, the system is provided with the following data:
  sensor 114: surface 130a detected at distance less than ground level G at depth D1 above ground level G and sensor 114 not in contact with water;
  sensor 115: surface level detected matches distance to ground G and sensor 115 not in contact with water;
  Attitude sensor (not illustrated): vehicle 110 at inclined angle, nose down;

During the time period shown in FIG. 3a, the system 180 is optionally provided only with the above listed data and is configured to determine that the vehicle 110 is travelling down an inclined surface; the front end of the vehicle 110 is partially disposed in shallow water of depth D1 at sensor 114, whereas the rear-end of the vehicle 110 is out of the water; and that the vehicle 110 may be entering into deeper water because of the inclination of the surface G. Monitoring of the vehicle 110 and environment continues.

During the time period shown in FIG. 3b, the system 180 is provided with the following data:
  sensor 114: surface detected at depth D2 above ground level G and sensor 114 not in contact with water;
  sensor 115: surface level detected matches distance to ground G and sensor 115 not in contact with water;
  Attitude sensor: vehicle at inclined angle, nose down;
  Ride Height: Normal;

During the time period shown in FIG. 3b, because water has been detected at the control threshold depth and because the vehicle 110 is in a "nose down" attitude and has travelled into deeper water (compared to the last assessment or measurement made), the system 180 is configured to determine at this point that there is a possibility that the vehicle 110 will enter into deeper water. The system is configured to take at least one appropriate pre-emptive action upon or shortly after making this determination in order to protect the vehicle 110 and prepare the vehicle 110 for wading (for example: suspend start-stop mode; or activate internal combustion engine if off; and/or increase vehicle ride-height).

It can be appreciated that various changes may be made within the scope of the present invention, for example, in other embodiments of the invention it is envisaged that the determination of the possibility that the vehicle may be about to enter into water of a sufficient depth that precautions should be taken (also referred to herein as a "positive determination") may depend upon a number of factors based upon the amount of information available to the system and the nature of that information.

It will be appreciated that only under-body mounted one sensor 14, 15, 114 may be provided on the vehicle 10, 110 or that the vehicle may comprise additional higher mounted sensors 140, 116a, 116b. Advantageously a single sensor 15 may be disposed at, adjacent or close to an exhaust tailpipe of the vehicle. The single sensor may comprise an existing ultrasonic sensor or, advantageously, an additional sensor. Alternatively, a plurality of sensors 14, 15 may be provided on the vehicle. The sensor may be of any suitable kind. For example the sensor may emit and receive a pulse, where propagation/reflection speed is different in water than in air.

In other embodiments a positive determination does depend upon detecting water at control threshold depth. In yet further embodiments of the system, in some situations a positive determination may be made based on detection of water at the threshold depth and in some situations a positive determination may be made irrespective of whether water at a threshold depth has been detected. For example, a prediction may be made based upon a detected water surface approaching a predetermined control threshold. Furthermore, the control threshold depth may not be a single depth value but may be a range and a surface detected within the control threshold depth range, optionally for a predetermined time period, may give rise to the system making a positive determination.

In some envisaged embodiments, in response to the system making a positive determination, the control unit may automatically check the condition of the vehicle and in response thereto may automatically change the vehicle condition by activating, suspending or deactivating one or more vehicle operations or vehicle functions. Alternatively, in other embodiments, the control unit may alert and advise the driver to change the vehicle condition. In some embodiments it is envisaged that it may be a user selectable preference whether the system performs certain pre-emptive and protective measures automatically or only provides a warning alert or other suitable indication for the driver. As such a vehicle may effectively be provided with more than one system according to the invention.

Furthermore it will be realised that the performance of certain functions may be more important than certain other functions and when the system makes a positive determination higher priority actions may be taken first and other lower priority pre-emptive actions may be made afterwards. Indeed the system may be equipped with more than one control threshold depth level at a first (shallower) one of which certain high-priority control actions are taken and then at a second (deeper) one of which certain other lower-priority actions are taken.

Furthermore in envisaged embodiments, any or each of the remote and/or contact sensors may be operated intermittently or continuously. The data received by the control unit of the system may be time-averaged and then analysed in order to make a determination as to whether the vehicle may be about to enter into a wading event.

Optionally one or more contact and remote sensor(s) may be under-body mounted and may be ultrasonic sensors (such as a Parking Distance Control (PDC) sensor), submersion in water of which causes a measurable change in the behavior of the water submerssion sensor. The measurable change in behavior may be identified by a control unit of the system which is configured to monitor data signals issued to it by the water submerssion sensor and used by the control unit, (optionally along with other data received by it), to determine that the vehicle is in water of a depth relative to the mounting position of the PDC. This determination is optionally made before the vehicle enters a wading situation and optionally before the water reaches a sufficient depth that ingress of water via the tail pipe of the vehicle exhaust is likely. Alternatively or additionally, the contact sensor may be a hydrostatic pressure sensor such as that described in WO/080432 (PCT/EP2011/072991) to the present applicant, which is incorporated herein by reference).

Optionally such an under-body mounted water detection contact sensor in some envisaged embodiments is positioned on one or more of the following components, but not limited to: front subframe; radiator support pack; bumper beam; wheel arch liner; suspension knuckle; lower arms; or other similar component. Advantageously, such components are less prone to interference or erroneous water level measurement since they are at least partially shielded from splashing and/or precipitation. Sensors placed on these locations may provide more reliable measurements of the depth of the water being waded through than a remote sensor.

In envisaged embodiments, the contact sensor(s) may be a capacitive or resistive sensor whereby the capacitance or resistance changes significantly in the presence of water (such as sensors described in WO/2012/080430 (PCT/EP2011/072988)to the present applicant, which is incorporated herein by reference).

Additionally or alternatively, in embodiments where at least one contact sensor is provided, the contact sensor may have a diaphragm or the like the physical characteristics of which are affected in a measurable way because of contact, by immersion, with water. For example, the diaphragm or the like may be sensitive to the increase in pressure when submerged in or in contact with water on one side thereof, or to a buoyancy effect.

In envisaged embodiments, a downwardly oriented ultrasound transducer or other suitable ranging sensor (such as a laser) can be used to remotely detect a distance between that sensor and the ground upon which the vehicle is travelling. If water (or another reflective surface) intersects the path of the ultrasound pulse between the sensor and ground level, this can be determined from a reduced range measurement derived from the sensor data. (The time of flight of the ultrasonic pulse will be reduced because the path length of the ultrasonic pulse will be reduced because of the presence of water. Dividing the time of flight by two and multiplying by the longitudinal velocity of ultrasound in air will give an estimation of the distance between the sensor and the reflecting surface. If this distance (also referred to as target range) is less than the known distance between the sensor and ground level (optionally including a tolerance for grazing angle and vehicle altitude for more accurate depth estimation) then a determination can be made that the vehicle is partly disposed in water or that water exists ahead of the vehicle line of travel. The confidence of this determination can be increased by comparing similar measurements from two or more sensors. Of particular benefit is the comparison of the target range measurements derived from sensors on different sides (left and right) of the vehicle and at different heights (for example under body and wing mirror).

The sensor may be an optical sensor arranged to be sensitive to a change in the refractive index of the medium in contact with the sensor. This medium would typically be air for normal driving conditions but would be water when the vehicle is wading.

In envisaged embodiments, optionally one or more sensors of the system is configured to generate a signal, indicative of water reaching a control threshold depth;

wading and not wading. The signal may be used to alert the driver, for example by illuminating a warning lamp, displaying a message or generating a tone. This signal may be binary, indicative of the sensor being in contact with water or not, or may comprise a range of outputs indicative of the depth of the water through which the vehicle is travelling.

For example the sensor may be coupled to a vehicle electronic control unit (ECU) and may be polled or energized repeatedly in order to detect a change in the contact medium. The system and the sensors comprised in the system are optionally continuously active when the vehicle electrical system is activated (typically when the vehicle ignition key is 'on'), but may be de-activated and re-activated on demand by the vehicle driver. Alternatively, the sensors of the system may be intermittently active. Additionally or alternatively, data from each of any of the sensors may be stored and analysed over time to improve the confidence with which the system determines that a vehicle is possibly going to enter in a wading event. The sensor is preferably continuously active when the vehicle electrical system is activated (typically when the vehicle ignition key is 'on'), but may be de-activated and re-activated on demand by the vehicle driver.

The sensor may be mounted at any suitable location at the vehicle underside, in particular on or adjacent a vehicle exhaust tailpipe, on or adjacent an exhaust particle filter, or on or adjacent an under-body mounted battery pack. These locations are low and are thus likely to be in early direct contact with water at wading depth. The battery pack may be a motive power source of a hybrid vehicle.

In one embodiment a vehicle may have a single sensor of the kind noted above. However several such sensors may be provided in order to indicate the presence of water at wading depth when going forward and when going backwards. For this purpose the sensors will be adjacent the vehicle front and rear extremities. Similarly sensors may be provided at either side of the vehicle so as to detect wading when travelling at a lateral inclination.

An important advantage of the invention is that the wading sensor is operable in part light and at night, when it may not be possible to easily distinguish between shallow puddles and water at wading depth.

In a further development the wading sensor(s) of the invention may be used in conjunction with an on-board wading depth indicator having an output to indicate wading depth to the driver by any suitable means. The sensor is preferably used to enable the depth indicator only when wading is detected, and can for example be used to activate an appropriate dashboard display to the driver.

In one embodiment the wading depth indicator comprises a plurality of sensors adapted to detect a change in the medium in contact therewith and arranged on a vehicle at successively higher locations.

An under-body mounted sensor according to the invention is inherently adapted to vehicles having adjustable height suspension.

The output of the sensor of the invention is preferably an electrical signal, and may be utilized within the vehicle ECU to, for example:
- disable an engine stop/start system, otherwise provided to improve vehicle fuel economy;
- disable regeneration of an exhaust particulate filter;
- to engage a special vehicle program adapted to wading, such as all wheel drive;
- limit vehicle speed and/or engage an appropriate gear ratio in the vehicle transmission and/or
- restart internal combustion engine.

In one embodiment the sensor of the invention is directed downwardly in use so that the detection means thereof is adapted to sense a change of medium at the lowest level. This configuration has the additional advantage that the sensing surface of the sensor is able to dry quickly after a wading event due to its orientation. The sensor may however be sensitive to immersion in order to provide confidence that water at wading depth has been sensed, and to distinguish from splashing.

In a further embodiment, a vehicle having a sensor of the present invention further comprises a powertrain and a powertrain controller arranged to control said powertrain in dependence on detection of a wading event detected by said wading sensor.

Other advantages will be apparent to one skilled in the art and the present examples and embodiments are to be considered illustrative and not restrictive. The invention is not to be limited to the details given herein, but may be modified within the scope and equivalence of the appended claims.

The invention claimed is:

1. A system for determining that there is a possibility that a land vehicle is about to travel through water at a vehicle wading depth wherein an exhaust tailpipe of the vehicle is submerged in water, comprising:
   at least one under-body mounted sensor configured to remotely and/or directly detect the presence of water substantially below and/or about the under-body mounted sensor at a control threshold depth, wherein said control threshold depth is below the wading depth and the tailpipe is not submerged in water at said control threshold depth; and
   a controller configured to implement one or more vehicle control strategies in dependence on said detection of the presence of water at said control threshold depth.

2. A system according to claim 1, wherein said controller comprises a powertrain controller arranged to control a powertrain of the vehicle and wherein said one or more vehicle control strategies comprises controlling the powertrain in dependence on detection of water by said sensor.

3. A system as claimed in claim 2, wherein the powertrain controller is arranged to suspend a stop/start function of the powertrain so as to prevent automatic shut down of the powertrain in response to detection of water at said control threshold depth.

4. A system as claimed in claim 2, wherein the powertrain controller is arranged to activate a stopped internal combustion engine in response to detection of water at said control threshold depth.

5. A system as claimed in claim 2, wherein the powertrain controller is arranged to increase the engine speed so as to increase positive pressure in the exhaust system in response to detection of water at said control threshold depth.

6. A system as claimed in claim 2, wherein the powertrain controller is arranged to regulate the idle speed of the engine to control the exhaust gas pressure so as to control positive pressure in the exhaust system in response to detection of water at said control threshold depth.

7. A system according to claim 1, wherein the control threshold depth is: a water depth between ground level and the position of the sensor; a water depth of about 100 mm to about 200 mm; or a depth at least 20 mm below the opening of a vehicle exhaust tailpipe outlet.

8. A system according to claim 1, wherein there comprises more than one under-body mounted sensor, wherein one or more of the under-body mounted sensors is an ultrasound transducer sensor and wherein the or each ultrasound transducer sensor is both configured to determine a depth of water the surface of which is substantially below the sensor and to detect the presence of water when the sensor is in contact with water.

9. A system according to claim 1, where, in determining that there is a possibility that the vehicle is about to travel through water at said wading depth, the system is configured to consider any one or a combination of: the mounting height of the under-body mounted ultrasonic sensor; the instant ride height of the vehicle; the vehicle drive speed; the height of the tailpipe; the depth of water, the surface of which is substantially below the sensor; the vehicle attitude; and the wading depth of the vehicle.

10. A system according to claim 1, wherein the system is configured lower the control threshold depth when the vehicle is being driven in a reverse gear and/or in a nose up attitude.

11. A system according to claim 1, wherein the controller is further configured automatically reactivate a suspended start start-stop mode when vehicle drive speed exceeds a non-wading threshold drive speed.

12. A system according to claim 1, wherein the controller is further configured automatically reactivate a suspended start start-stop mode if the water level detected by all sensors of the system is below one of the control threshold depth or an exit threshold depth.

13. A vehicle comprising a system according to claim 1.

14. A vehicle according to claim 13, wherein the system comprises more than one under-body mounted ultrasound transducer sensor and wherein at least one said ultrasound transducer sensor is disposed proximate the front of the vehicle and wherein at least one said ultrasound transducer sensor is disposed proximate the rear of the vehicle.

15. A method of controlling a vehicle having an engine, the method comprising:
  detecting that there is a possibility that the vehicle is about to travel through water at a vehicle wading depth at which an exhaust tailpipe of the vehicle is submerged in water by remotely and/or directly detecting the presence of water at a control threshold depth, wherein said control threshold depth is below said wading depth, and
  in response to detection of water at said control threshold depth, at least one of:
  suspending a stop/start function of the vehicle so as to prevent automatic shut down of the engine;
  activating a stopped internal combustion engine;
  increasing the speed of the engine so as to increase positive pressure in the exhaust system; and
  regulating the speed of the engine to control the exhaust gas pressure.

16. A method according claims 15, further comprising automatically reactivating a suspended start start-stop mode:
  when vehicle drive speed exceeds a non-wading threshold drive speed; or
  if the detected water level is below one of the control threshold depth or an exit threshold depth.

17. A computer program for implementing the method of claim 15.

18. A system for controlling a land vehicle having a combustion engine, the system comprising:
  at least one sensor configured to remotely and/or directly detect the presence of water substantially below and/or about the sensor at a control threshold depth, wherein said control threshold depth is a water depth below an exhaust tailpipe of the vehicle; and
  a controller configured to, in dependence on said detection of the presence of water at said control threshold depth, suspend a stop/start function of the vehicle so as to prevent automatic shut down of the combustion engine.

19. A system according to claim 18, wherein said controller is further configured to control the internal combustion engine to perform one or more of: activating the internal combustion engine of the vehicle if stopped; increasing the engine speed so as to increase positive pressure in the exhaust system; and regulating the speed of the engine to control the exhaust gas pressure.

20. A vehicle comprising a system according to claim 18.

\* \* \* \* \*